(12) United States Patent
Kakiuchi et al.

(10) Patent No.: US 6,734,450 B2
(45) Date of Patent: May 11, 2004

(54) THREE-DIMENSIONAL IMAGE CAPTURING DEVICE

(75) Inventors: Shinichi Kakiuchi, Saitama (JP); Shuzo Seo, Saitama (JP); Nobuhiro Tani, Tokyo (JP); Kiyoshi Yamamoto, Tokyo (JP)

(73) Assignee: PENTAX Corporation, Tokyo (JP)

( * ) Notice: Subject to any disclaimer, the term of this patent is extended or adjusted under 35 U.S.C. 154(b) by 7 days.

(21) Appl. No.: 10/084,930

(22) Filed: Mar. 1, 2002

(65) Prior Publication Data

US 2002/0148947 A1 Oct. 17, 2002

(30) Foreign Application Priority Data

Mar. 2, 2001 (JP) .................................... P2001-057847

(51) Int. Cl.$^7$ ............................ G01V 8/00; H01J 40/14; G01C 3/08
(52) U.S. Cl. ............... 250/559.38; 250/221; 250/222.1; 356/4.01; 356/4.07; 356/5.01
(58) Field of Search ............................... 250/208.1, 221, 250/222.1, 559.38; 356/4.07, 3.1, 3.11, 3.01, 5.01; 396/106, 109, 110, 182, 199, 324; 348/135, 140, 42, 34, 370

(56) References Cited

U.S. PATENT DOCUMENTS 5,099,266 A * 3/1992 Nakajima et al.
6,121,603 A * 9/2000 Hang et al.
6,207,946 B1 * 3/2001 Jusoh et al.
6,392,744 B1 * 5/2002 Holec

OTHER PUBLICATIONS

"Design and Development of a Multi–Detecting Two–Dimensional Ranging Sensor", by S. Christie et al., in Measurement Science and Technology, vol. 6, 1995, pp. 1301–1308.

"Axi–Vision Camera" by M. Kawakita et al., in Applied Optics, vol. 39, No. 22, Aug. 1, 2000, pp. 3931–3939.

* cited by examiner

Primary Examiner—David Porta
Assistant Examiner—David C. Meyer
(74) Attorney, Agent, or Firm—Greenblum & Bernstein, P.L.C.

(57) ABSTRACT

A three-dimensional image capturing device comprises a light source for irradiating a distance measuring light beam to a subject. The light source has a plurality of light source rings, each of which is formed of a plurality of LEDs. The LEDs are annularly disposed along an outer periphery of a lens barrel. The ratio of the intensities of light beams irradiated by the first, second, third, fourth, and fifth light source rings is 1:2:4:8:16. The intensity of the distance measuring light beam irradiated by the light source rings is modulated by selecting the light source rings to be turned ON, so that the intensity of the distance measuring light beam changes in accordance with the time.

11 Claims, 9 Drawing Sheets

FIG. 2

| INTENSITY | FIRST L.S.RING | SECOND L.S.RING | THIRD L.S.RING | FOURTH L.S.RING | FIFTH L.S.RING |
|---|---|---|---|---|---|
| 0 | OFF | OFF | OFF | OFF | OFF |
| 1 | ON | OFF | OFF | OFF | OFF |
| 2 | OFF | ON | OFF | OFF | OFF |
| 3 | ON | ON | OFF | OFF | OFF |
| 4 | OFF | OFF | ON | OFF | OFF |
| 5 | ON | OFF | ON | OFF | OFF |
| 6 | OFF | ON | ON | OFF | OFF |
| 7 | ON | ON | ON | OFF | OFF |
| 8 | OFF | OFF | OFF | ON | OFF |
| 9 | ON | OFF | OFF | ON | OFF |
| 10 | OFF | ON | OFF | ON | OFF |
| 11 | ON | ON | OFF | ON | OFF |
| 12 | OFF | OFF | ON | ON | OFF |
| 13 | ON | OFF | ON | ON | OFF |
| 14 | OFF | ON | ON | ON | OFF |
| 15 | ON | ON | ON | ON | OFF |
| 16 | OFF | OFF | OFF | OFF | ON |
| 17 | ON | OFF | OFF | OFF | ON |
| 18 | OFF | ON | OFF | OFF | ON |
| 19 | ON | ON | OFF | OFF | ON |
| 20 | OFF | OFF | ON | OFF | ON |
| 21 | ON | OFF | ON | OFF | ON |
| 22 | OFF | ON | ON | OFF | ON |
| 23 | ON | ON | ON | OFF | ON |
| 24 | OFF | OFF | OFF | ON | ON |
| 25 | ON | OFF | OFF | ON | ON |
| 26 | OFF | ON | OFF | ON | ON |
| 27 | ON | ON | OFF | ON | ON |
| 28 | OFF | OFF | ON | ON | ON |
| 29 | ON | OFF | ON | ON | ON |
| 30 | OFF | ON | ON | ON | ON |
| 31 | ON | ON | ON | ON | ON |

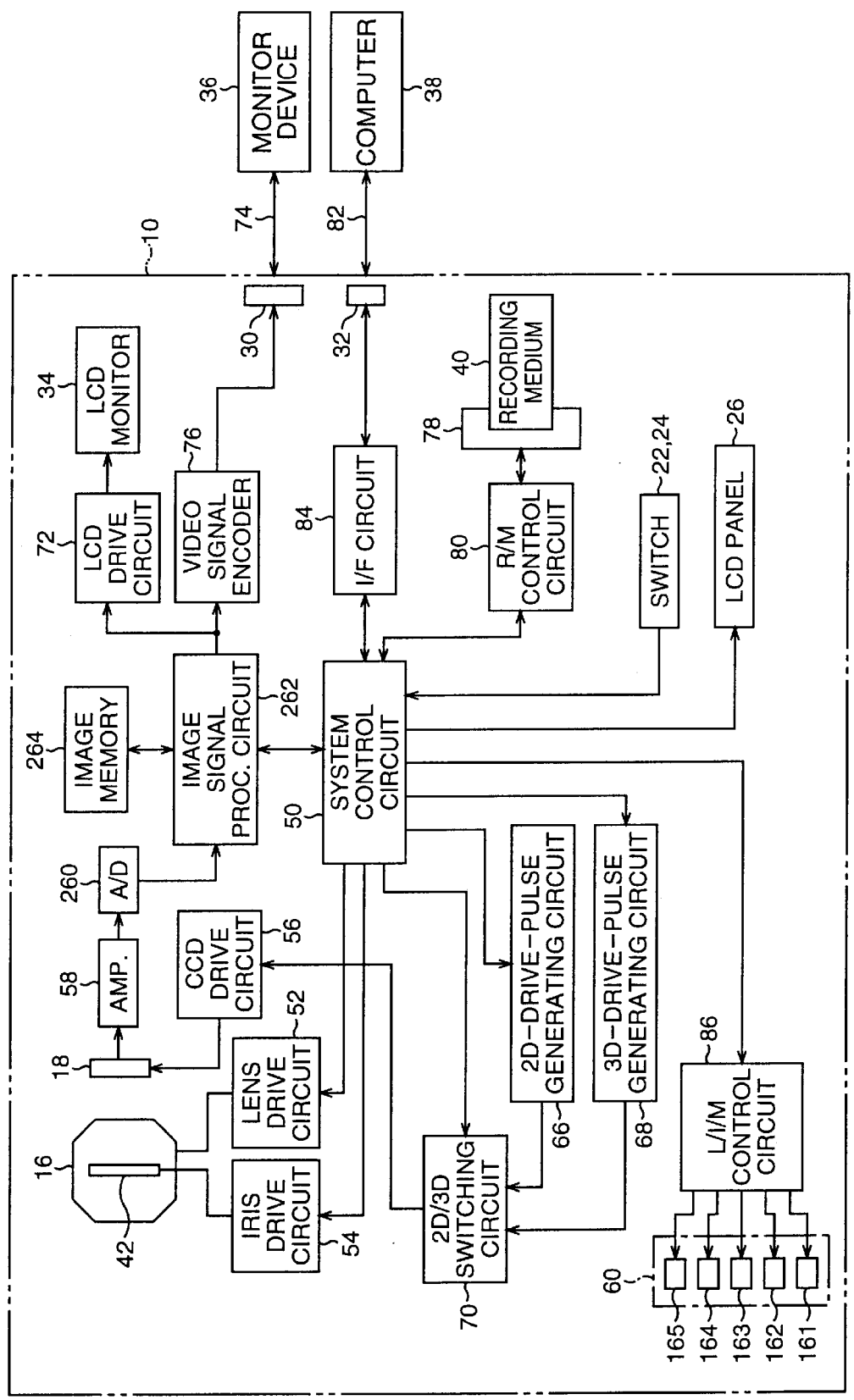

THREE-DIMENSIONAL IMAGE CAPTURING DEVICE

BACKGROUND OF THE INVENTION

1. Field of the Invention

The present invention relates to a three-dimensional image capturing device that obtains three-dimensional information of a measurement subject, based on luminous information obtained by photographing the subject.

2. Description of the Related Art

In these past few years, three-dimensional image technology has been developed, and a three-dimensional image capturing device, which can sense distance information of a subject, has been put into practical use. There are various ways of sensing three-dimensional information of a subject. In particular, there is known a system combining a camera, having a high-speed shutter function, and a modulation unit, for varying the intensity of the distance measuring light beam in accordance with time. In this system, the distance measuring light beam, of which the intensity is modulated, is irradiated onto a subject, and the delay of the reflected light beam, generated in accordance with the distance between the light source and the surface of the subject, is sensed by the high-speed shutter camera, so that the three-dimensional shape of the subject is obtained.

Regarding the light source, it is preferable to use an LED in which the intensity of light is adjusted by changing the electric current, and a plurality of LEDs are electrically connected in series so as to simultaneously adjust therein, intensities. However, since the intensity of light of an LED depends upon the ambient temperature, it is necessary to feedback-control the change in the intensity of light while monitoring it. This creates a particular problem in that the control circuit for controlling the change of intensity of light over a wide range for a single LED is complicated and bulky.

SUMMARY OF THE INVENTION

Therefore, an object of the present invention is to provide a three-dimensional image capturing device in which the amount of light supplied to the light source irradiating the distance measuring light beam is stably controlled with a simple circuit.

According to the present invention, there is provided a three-dimensional image capturing device, comprising a light source, a modulating processor, a light sensing processor, and a distance obtaining processor.

The light source has a plurality of irradiating units to irradiate a distance measuring light beam to a subject. The intensities of the distance measuring light beams are different from each other. The modulating processor selects at least one of the irradiating units and modulates the intensity of the distance measuring light beam in accordance with the time elapsed from when the light source started irradiating the distance measuring light beam. The light sensing processor senses the distance measuring light beam reflected by the subject in accordance with a timing of the modulation, to obtain luminous information of the subject. The distance obtaining processor obtains distance information of the subject based on the luminous information.

The irradiating unit preferably has a plurality of LEDs that are annularly disposed along an outer periphery of a lens barrel in which a photographing lens is provided, and the LEDs are electrically connected to each other in series. In this case, the modulating processor simultaneously controls electric current flowing in each of the LEDs. Due to this, the modulation of the intensity of distance measuring light beam can be stably performed with a simple circuit.

The plurality of irradiating units maybe concentrically disposed to each other, and may have first, second, third, fourth, and fifth irradiating units, which are arranged from the center to the outmost periphery in this order. The ratio of the intensities of the distance measuring light beams of the first, second, third, fourth, and fifth irradiating units may be 1:2:4:8:16. If this ratio is used, the distance measuring light beam can be uniformly irradiated, and the intensity can be easily modulated stepwise, i.e., in 32 steps by selecting the combination of irradiating units which are to be turned ON.

Preferably, the luminous information comprises first and second luminous information, the first luminous information being obtained by increasing the intensity stepwise using the modulating processor, the second luminous information being obtained by decreasing the intensity stepwise using the modulating processor. The distance obtaining processor can obtain the distance information using the first and second luminous information. Therefore, highly accurate distance information is obtained that does not depend on the reflectance on the surface of the subject nor the unevenness of the distance measuring light beam in space.

BRIEF DESCRIPTION OF THE DRAWINGS

The objects and advantages of the present invention will be better understood from the following description, with reference to the accompanying drawings in which:

FIG. 2 is a table showing a relationship between the intensity of light and light source rings to be turned ON;

FIG. 5 is a block diagram showing a circuit of the three-dimensional image capturing device shown in FIG. 1;

DESCRIPTION OF THE PREFERRED EMBODIMENTS

Figure 1:
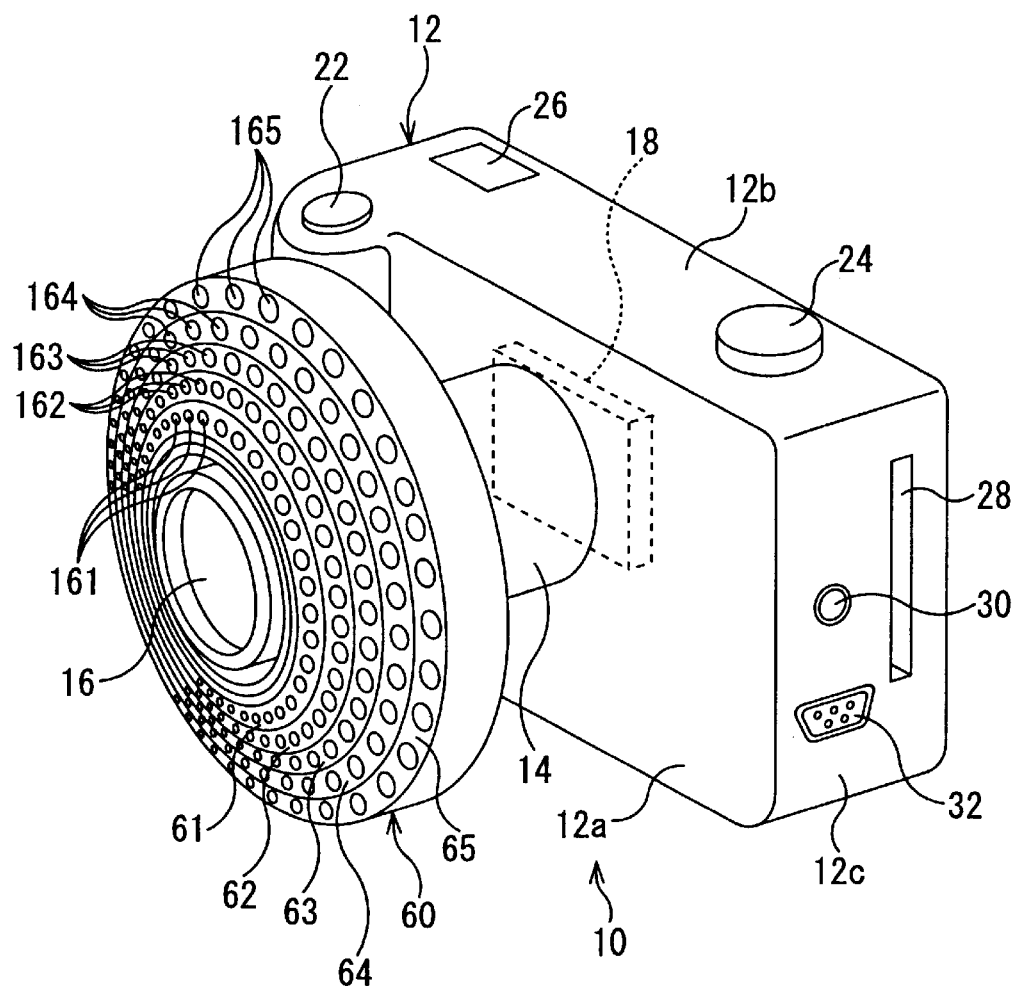
FIG. 1 is a perspective view showing a three-dimensional image capturing device of an embodiment of the present invention.

The present invention will be described below with reference to the embodiments shown in the drawings.

FIG. 1 is an external view of a three-dimensional image capturing device of an embodiment of the present invention. The three-dimensional image capturing device 10 has a box-shaped body 12, and a lens barrel 14 provided on a front surface 12a of the body 12. A photographing optical system (not shown) having a plurality of lens groups is housed in the lens barrel 14, so that an optical image obtained by the photographing optical system is formed on a light receiving surface of an imaging device, such as a CCD 18 provided in the body 12.

An upper surface 12b of the body 12 is provided with a release button 22 for commanding an operation, such as a photography, a mode dial 24 for selecting one of a reproduction mode or a photographing mode, and a liquid crystal display panel 26 for indicating information such as a number of photographed images. When the photographing mode is set, distance information is sensed using a distance measuring light beam and a two-dimensional still image is sensed, as will be described later. The distance information is attached to the two-dimensional still image data. A side surface 12c of the body 12 is provided with a card slot 28 for inserting an image recording medium such as an IC card, a video output terminal 30 for outputting an image to a monitor device as a video signal, and an interface connector 32 for outputting the image to a personal computer. A rear surface (not shown) of the body 12 is provided with an LCD monitor, to indicate a subject image to be photographed as a moving image, and to indicate an image which has been photographed as a moving or still image.

A light source 60 is provided on the periphery of the lens barrel to irradiate a distance measuring light beam, of which the intensity of light is modulated. The light source 60 has first through fifth light source rings 61, 62, 63, 64, and 65, which are irradiating units and are concentrically disposed. The first through fifth light source rings 61, 62, 63, 64, and 65 are arranged from the inside to the outside of the periphery in this order. In each of the light source rings 61, 62, 63, 64, and 65 positioned around the outer periphery of the lens barrel 14, a plurality of LEDs 161, 162, 163, 164, and 165 are annularly uniformly disposed and are electrically connected to each other in series. The LEDs irradiate light beams toward a subject. The LEDs have merits, such as small size, long life, low electric power consumption, and the ability to adjust the amount of light in accordance with the supply of electric current. Therefore, the LEDs are preferable as a light source.

The LEDs 161 disposed in the first light source ring 61 are simultaneously all turned ON or all turned OFF, and when on, the LEDs irradiate light beams with a constant intensity. Regarding the other LEDs 162, 163, 164, and 165, the second, third, fourth, and fifth light source rings 62, 63, 64, and 65 are turned ON or OFF independently from each other. Namely, the first through fifth light source rings 61 through 65 are independently switched ON or OFF, and the output light of each light source ring is controlled to have a constant value.

The output of the first light source ring 61 in which all of the LEDs 161 are lit is indicated by the intensity R1, and similarly, the outputs of the second through fifth light source rings 62, 63, 64, and 65 are indicated by the intensities R2, R3, R4, and R5. The relationship between the intensities is indicated by the following formula (1):

$$R5 = R4 \cdot 2 = R3 \cdot 2^2 = R2 \cdot 2^3 = R1 \cdot 2^4 \quad (1)$$

The intensity R1 of the first light source ring 61, which is disposed at the innermost position, is the smallest, and the intensity increases by a factor of 2 toward the outside to produce the ratio 1, 2, 4, 8, and 16. Thus, the intensity R5 of the fifth light source ring 65, which is disposed at the outermost position, is 16 times the intensity R1. Note that the number of LEDs in each of the light source rings 61, 62, 63, 64, and 65 is not restricted to a specific value. The number of LEDs should be determined so that the intensities R1, R2, R3, R4, and R5 satisfy the formula (1).

Thus, the light source 60 is provided with the first through fifth light source rings 61, 62, 63, 64, and 65 all of which have different intensities of light, and hence, the intensity can be changed stepwise in 32 steps by varying the combination of the light source rings to be turned ON, for example; from a state in which all the LEDs are turned OFF (intensity 0) to a state in which all the LEDs are turned ON (intensity [R1·31]). FIG. 2 shows a relationship between the intensity of light and the light source rings that are turned ON.

Figure 3:
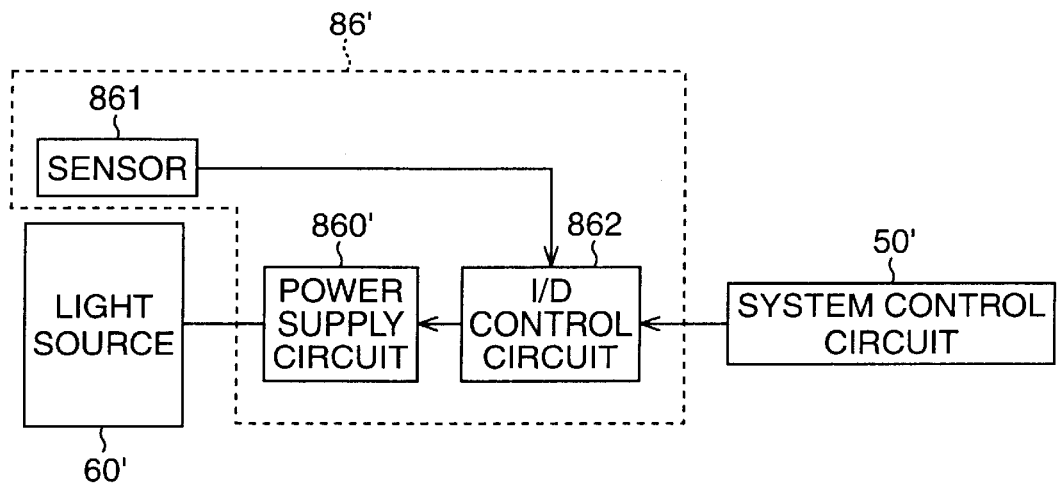
FIG. 3 is a block diagram showing a modulation circuit modulating the intensity of light in a comparison example.
Figure 4:
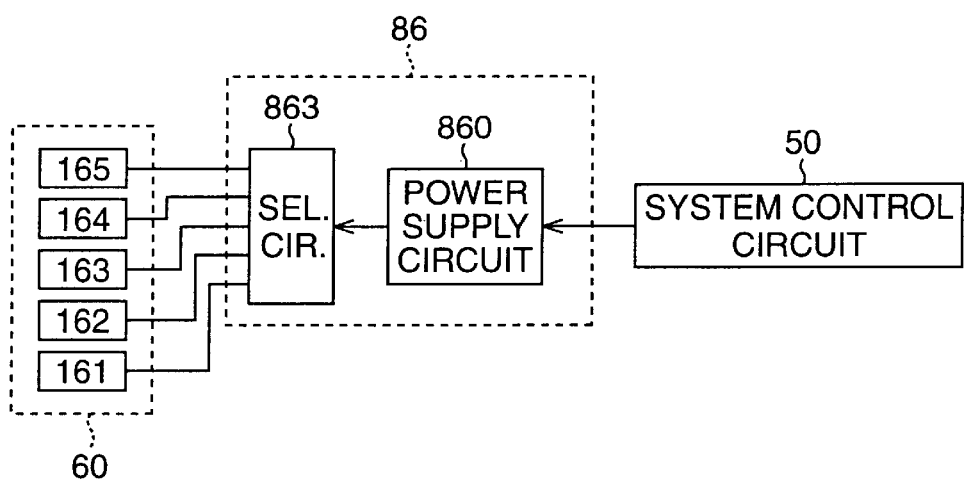
FIG. 4 is a block diagram showing a modulation circuit for modulating the intensity of light in the embodiment.

FIG. 3 shows a light intensity modulation control circuit 86' that modulates the intensity of light in a comparison example, and FIG. 4 shows a light intensity modulation control circuit 86 that modulates the intensity of light in the embodiment.

In the comparison example, the intensity of light of the light source 60' is adjusted by a power supply circuit 860', which is driven based on a command signal from a system control circuit 50'. When the light source 60' has a plurality of LEDs, since the intensity of light of an LED depends on the ambient temperature, it is necessary to provide an increase-decrease control circuit 862 to feedback-control the power supply circuit 860' while monitoring the intensity using a sensor 861. Especially, for controlling the change of intensity of light over a wide range for a single LED, it is necessary that the light intensity modulation control circuit 86' be complicated and bulky.

Conversely, in the three-dimensional image capturing device 10 of the embodiment, the amount of light is controlled only by selecting the LEDs 161 through 165, which are to be lit, through a selecting circuit 863, to which electric power is supplied from a power supply circuit 860 driven by a system control circuit 50. Further, electric current, flowing in each of the LEDs 161 through 165, is simultaneously and constantly controlled, so that each of the LEDs 161 through 165 is turned ON or OFF to irradiate light of a constant intensity. Therefore, the sensor and the increase-decrease control circuit are not needed, and the light intensity modulation control circuit 86 can be simple and miniaturized, and further, can stably control the amount of light. Thus, luminous information, i.e., distance information can be obtained with a high level of accuracy. Further, since the ratio of the light source rings 61 through 65 is 1:2:4:8:16, the intensity of the distance measuring light beam can be changed stepwise in 32 steps.

FIG. 5 is a block diagram showing a circuit of the three-dimensional image capturing device 10. Part of the lens groups comprising the photographing optical system 16 is moved along the optical axis by a lens drive circuit 52 controlled by the system control circuit 50, so that focus adjustment and zooming are carried out. An aperture 42 is disposed between the lens groups of the photographing optical system 16. The opening degree of the aperture 42 is adjusted by an iris drive circuit 54 controlled by the system control circuit 50.

An optical subject image obtained by the photographing optical system 16 is formed on a light receiving surface of the CCD 18, where electric charge corresponding to the subject image is generated. An accumulating operation of the electric charge and a reading operation of the electric charge in the CCD 18 are controlled by a CCD drive circuit 56. The CCD 18 has a function in which unwanted electric charge is discharged by applying a pulse of a predetermined voltage, and can perform a high-speed shutter operation with a few nano-seconds.

An electric charge signal read from the CCD, which is an analog image signal, is amplified by an amplifier 58, and is converted into a digital signal by an A/D converter 260. The digital image signal is subjected to predetermined image processes such as a gamma correction and a white balance adjustment in an image signal processing circuit 262, and is temporarily stored in an image memory 264.

The CCD drive circuit 56 is controlled by a pulse signal output from a 2D-drive-pulse generating circuit 66 or a 3D-drive-pulse generating circuit 68, and a pulse signal output from one of the circuits 66 or 68 is selected by a 2D/3D switching circuit 70, which is controlled by the system control circuit 50. A pulse signal output from the 2D-drive-pulse generating circuit 66 is used for carrying out a usual photographing operation in the CCD to obtain a two-dimensional color image of the subject. Conversely, a pulse signal output from the 3D-drive-pulse generating circuit 68 is used for obtaining distance information by the CCD.

One frame's worth of image signal temporarily stored in the image memory 264, is read from the image memory 264, and is supplied to an LCD drive circuit 72. The LCD drive circuit 72 is operated in accordance with the image signal, so that an image corresponding to the image signal is indicated by an LCD monitor 34. The series of operations above described are repeatedly performed at a predetermined interval when the photographing mode is set, so that the subject image is indicated by the LCD monitor 34 as a moving picture.

The photographed subject image can be recognized by a monitor device 36 provided outside the three-dimensional image capturing device 10. The monitor device 36 is connected to the video output terminal 30 by a cable 74. The digital image signal read from the image memory 264 is encoded to a video signal by a video signal encoder 76, and transmitted to the monitor device 36.

When the release button 22 is fully depressed while a moving image is indicated, a distance measuring operation using the distance measuring light beam is performed, so that one frame's worth of image signal, stored in the image memory 264 at that time, and distance information, corresponding to the image signal, are read from the image memory 264 and output to the system control circuit 50, and are converted into three-dimensional image data which conform with a predetermined format. The three-dimensional image data can be recorded in an image recording medium 40 if necessary. A card reading device 78 is housed in the body 12, and the image recording medium 40 is inserted through the card slot 28 and attached to the card reading device 78. A writing operation and a reading operation in the card reading device 78 are controlled by a recording medium control circuit 80.

The three-dimensional image data can also be transmitted to a computer 38 provided outside the three-dimensional image capturing device 10, so that an image is processed or output to a printer by the computer 38. The computer 38 is connected to the interface connector 32 through a cable 82. The image data is output from the system control circuit 50 to the interface connector 32 through an interface circuit 84.

Switches including the release switch 22 and the mode dial 24, and the liquid crystal display panel 26 are connected to the system control circuit 50.

The operation of the light source 60, which is ON-OFF operation of the LEDs 161 through 165, is controlled by the light intensity modulation control circuit 86, which selects the LEDs to be turned ON, in accordance with a command signal output from the system control circuit 50, so that the output of the distance measuring light beam is adjusted. The intensity of the distance measuring light beam is modulated in accordance with time, so that the intensity is stepwise increased from level 0 to level 31, and then stepwise decreased from level 31 to level 0.

Figure 6A:
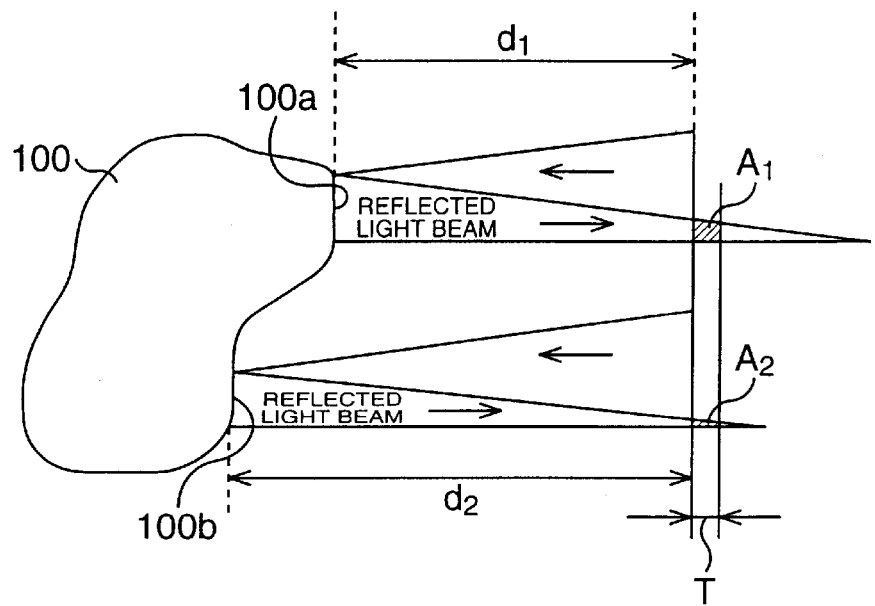
FIGS. 6A and 6B show views showing the principle behind distance measurement.
Figure 6B:
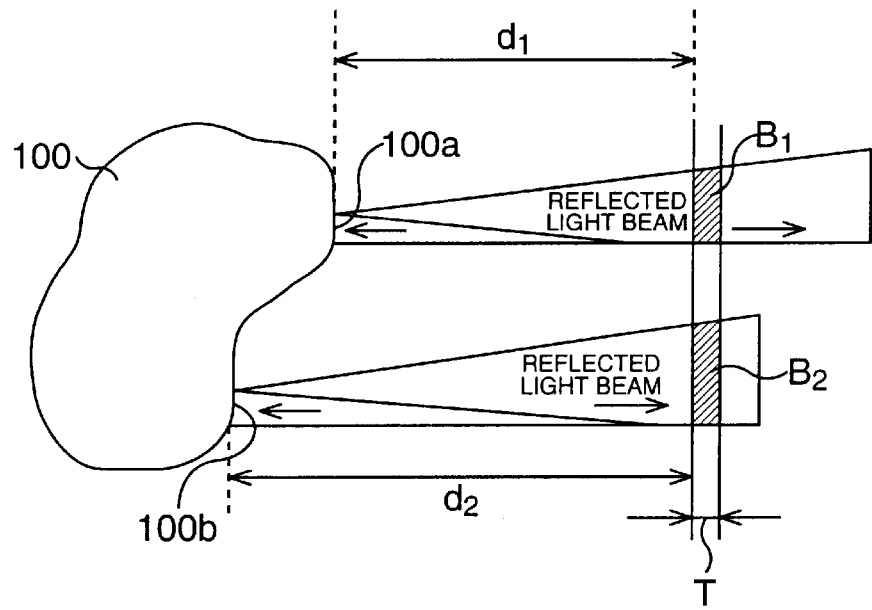

FIGS. 6A and 6B show views showing the principle behind the distance measurement. In the drawings, the light beam is indicated with a triangle strip, in which the vertical length indicates the intensity of the light.

FIG. 6A shows a state in which a light beam, the intensity of which is increased with time, is irradiated onto a subject 100, and is then received when a predetermined time has passed. The subject 100 has surfaces 100a and 100b which are at different distances from the three-dimensional image capturing device 10. It is supposed that when the light beams the intensities of which are gradually increased are simultaneously irradiated onto the subject 100, the amount of light reflected by the surface 100a separated from the subject 100 by the distance $d_1$ and then received for time T, is A1; and the amount of light reflected by the surface 100b separated from the subject 100 by distance $d_2$ ($d_2 > d_1$) and then received for time T, is A2. For the reflection from surface 100b, which is farther from the light source, since the distance through which the light beam travels is relatively long, a reflected light beam of lower intensity is received, and the received light amount A2 is less than the received light amount A1.

Thus, if the light beam for which the intensity is gradually increased is irradiated to sense an image, a difference would occur in the received light amount or the luminance, in accordance with the distance between the device and the subject. Therefore, if the reflected light beam from the subject is sensed by the CCD 18 while the subject is within the angle of view, the distance information can be obtained concurrently, regarding each point on the whole front surface of the subject.

In fact, however, the reflectance changes depending on the point on the surface of the subject, and the intensity of the diverged reflected light beam decreases and this decrease is inversely proportional to the square of the distance. Further, the sensed light contains components such as ambient light and light other than the reflected light. Accordingly, the amount of light received by the CCD 18 contains errors caused by these components, and therefore, it is necessary to correct or eliminate the effects of the components so that the subject distance is obtained with a high accuracy. In the embodiment, as shown in FIG. 6B, photography is performed using light on which the intensity is decreased with time, in a similar way as that shown in FIG. 6A, to obtain luminous information, i.e., distance information. The subject distance is calculated, based on two kinds of luminous information, one obtained using increased intensity and the other using decreased intensity.

In the operation shown in FIG. 6B, the light, for which the intensity is decreased with time, is irradiated onto the surfaces 100a and 100b of the subject 100, and it is supposed that the amounts of light, reflected by the surfaces 100a and 100b when time T has passed since the output of the distance measuring light beam, are B1 and B2, respectively. Due to the delay in the reflected light beam from the surface 100b, the reflected light beam of relatively high intensity is received, and the received light amount B2 is greater than the received light amount B1.

Figure 7:
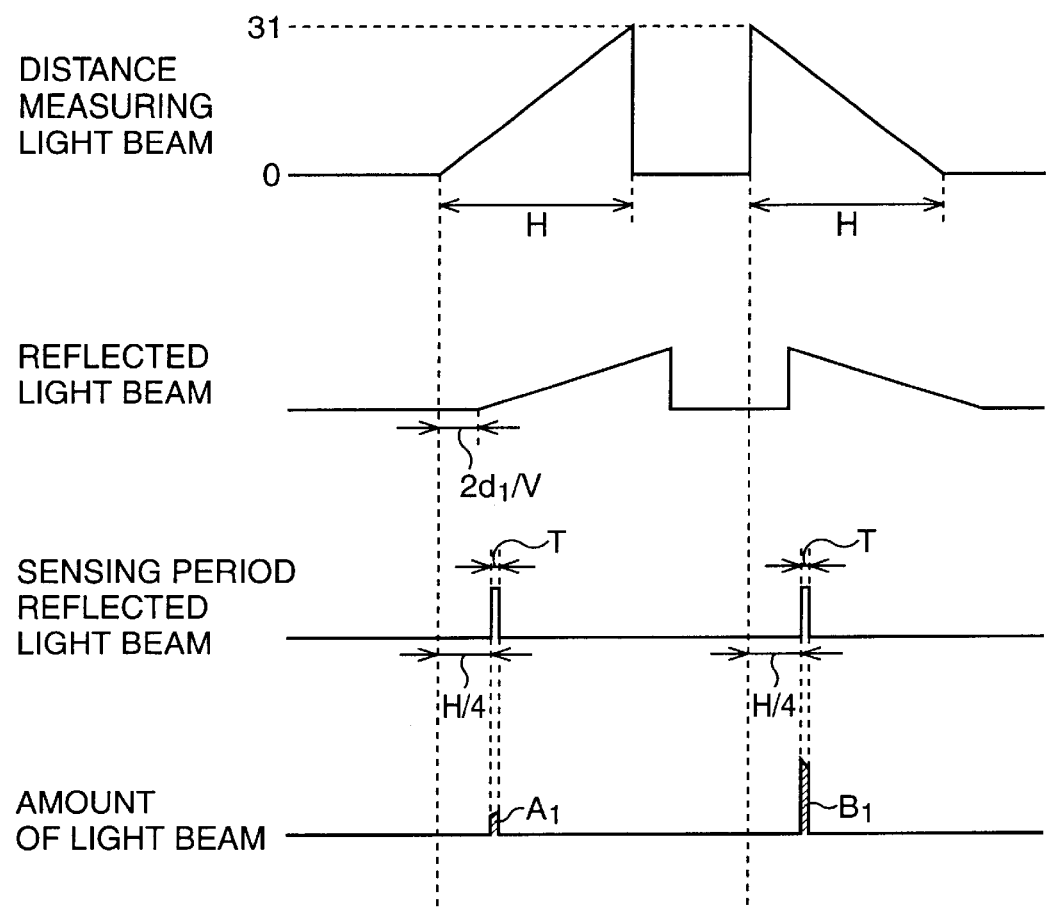
FIG. 7 is a timing chart showing a distance measuring light beam, a reflected light beam, and amount of light received by a CCD.

FIG. 7 is a timing chart showing a distance measuring light beam for which the intensity is modulated, a reflected light beam from the subject surface 100a, a sensing period of the reflected light beam, and a distribution of the amount of light beams received by the CCD 18. When the intensity of the distance measuring light beam is increased from level 0 to level 31 for time H, the reflected light beam reaches with delay $2d_1/V$ (V; speed of light). It is supposed that the CCD 18 senses the reflected light beam when H/4 has passed since starting the irradiation, and the sensing period, i.e., the shutter speed is T. The received light amount A1 is indicated by the following formula (2):

$$A1 = \frac{2I_0}{H} \cdot \frac{\sigma}{(4\pi d_1^2)^2} \cdot \left(\frac{H}{4} - \frac{2d_1}{V}\right) \quad (2)$$

wherein $I_0$ is the amplitude of the distance measuring light beam, and $\sigma$ is a sectional area of back scattering of the subject, and V is speed of light.

When the intensity of the distance measuring light beam is decreased from level 31 to level 0 for time H, and the shutter is open for time H, the received light amount B1 is indicated by the following formula (3):

$$B1 = \frac{\sigma}{(4\pi d_1^2)^2} \cdot \left\{I_o - \frac{2I_0}{H}\left(\frac{H}{4} - \frac{2d_1}{V}\right)\right\} \quad (3)$$

If it is supposed that the ratio of received light A1 to received light B1 is R (=A1/B1), the distance $d_1$ to the subject 100 is indicated by the following formula (4):

$$d_1 = \frac{VH}{4}\left(\frac{1-R}{1+R}\right) \quad (4)$$

$$\text{wherein } R = \frac{A1}{B1}$$

Therefore, using the formula (4), the subject distance is calculated based on the ratio of the light beams for which the intensity of light is increased and decreased. This calculation is performed for each pixel of the subject image. Note that, in the following explanation, data for the received light amount for all pixels of the CCD 18 when increasing the intensity of light, is referred to as first luminous information, and data for the received light amount for all pixels of the CCD 18 when decreasing the intensity of light, is referred to as second luminous information.

Figure 8A:
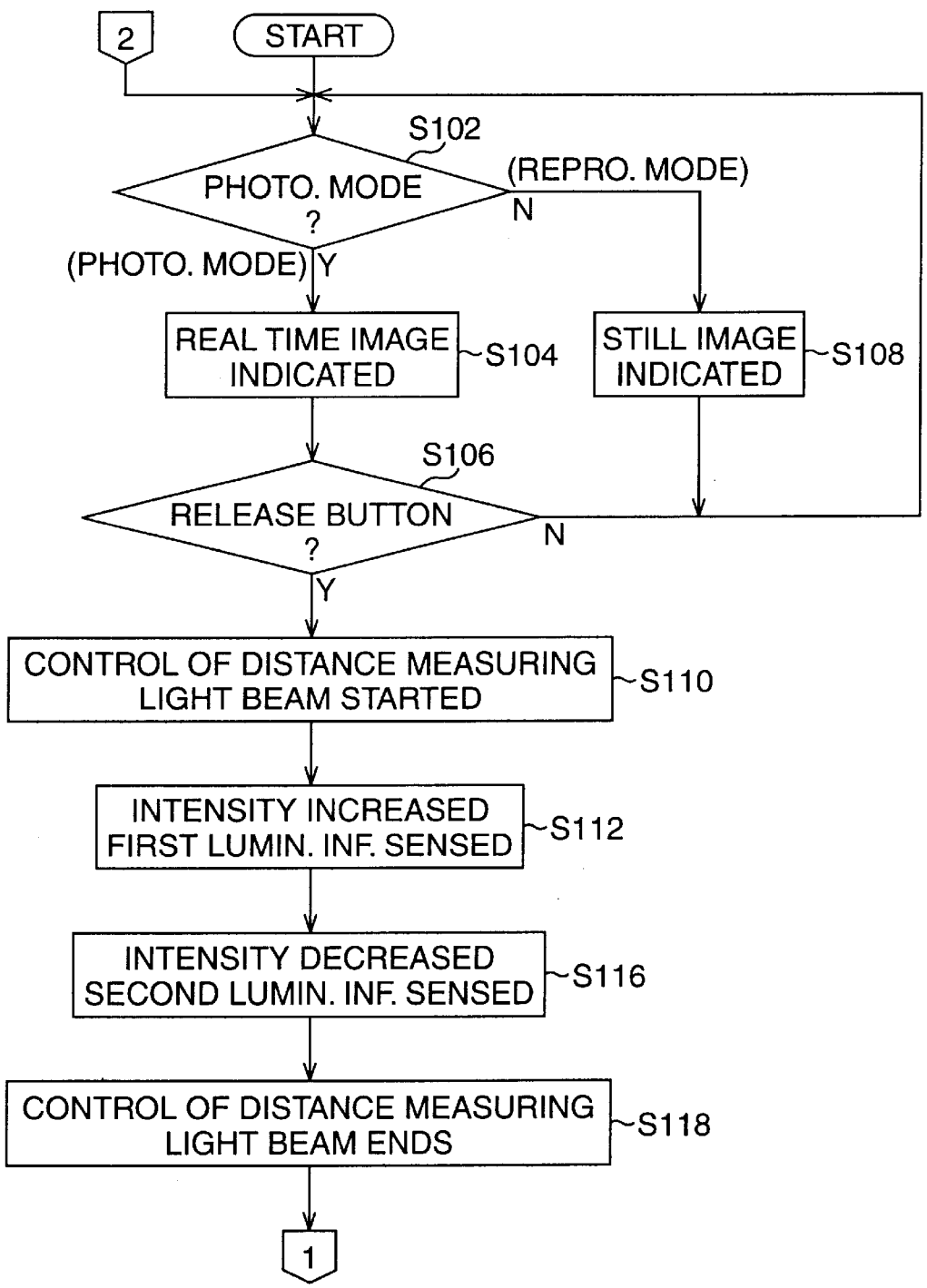
FIGS. 8A and 8B show a flowchart of the distance information sensing operation.
Figure 8B:
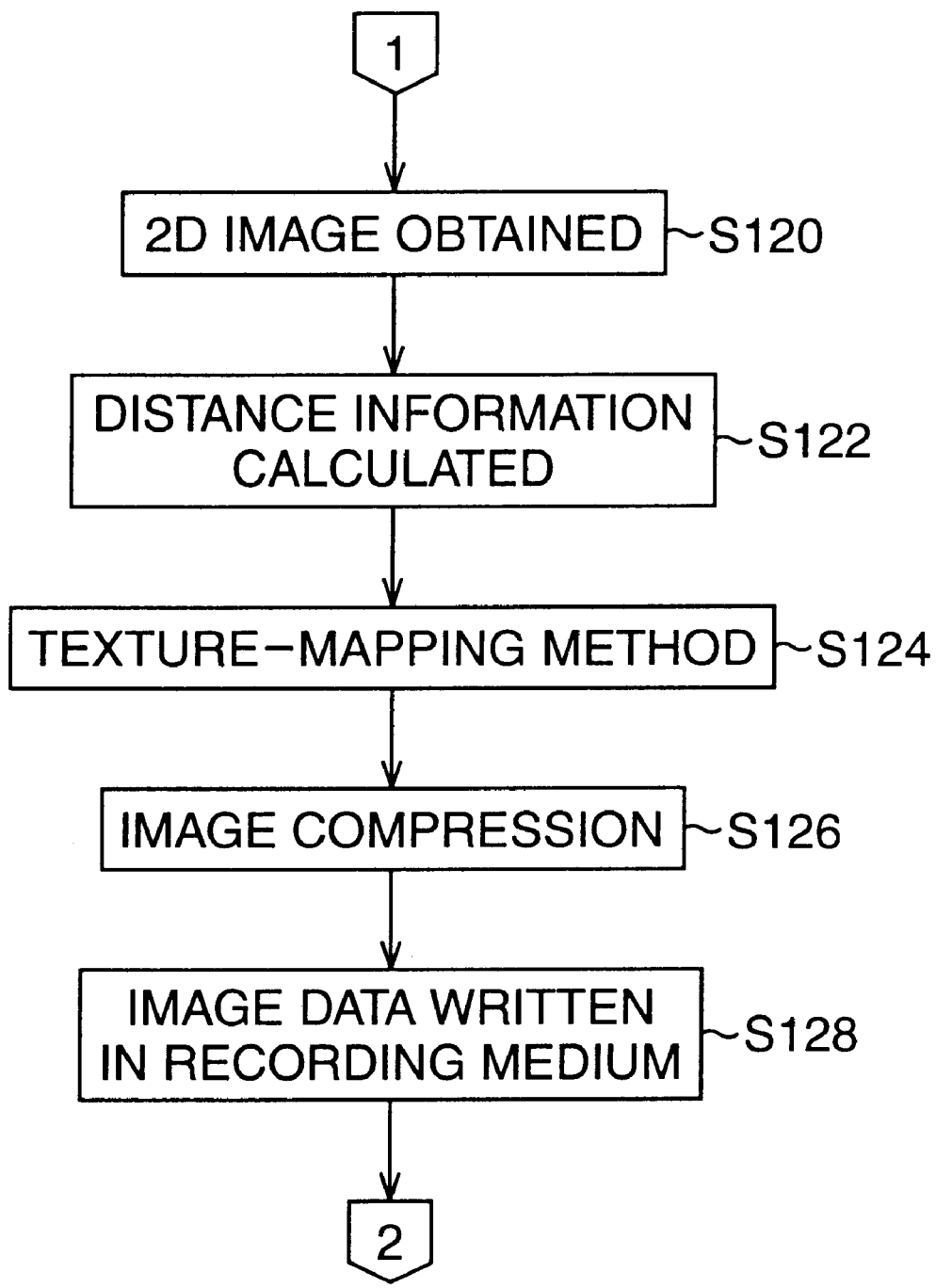
Figure 9:
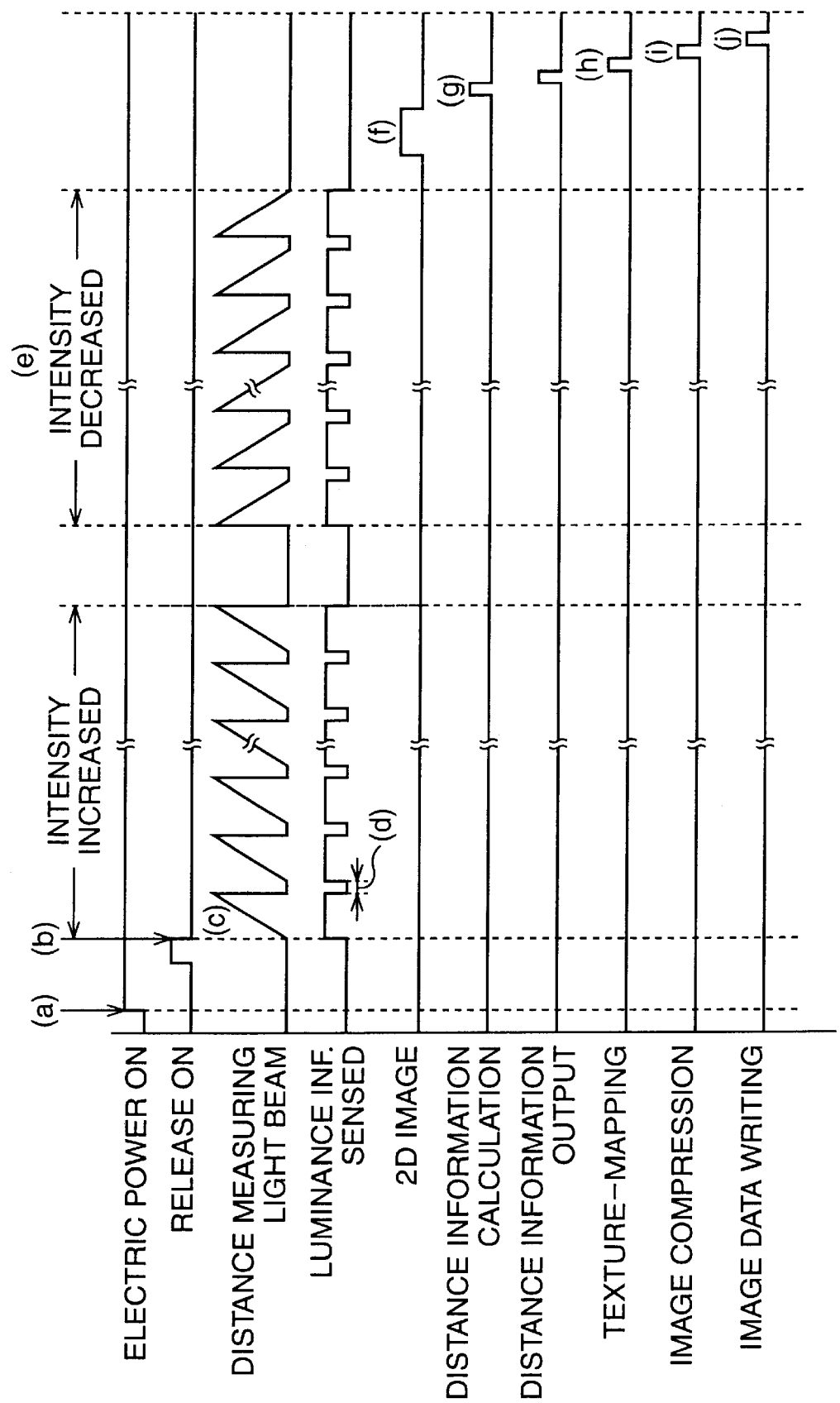
FIG. 9 is a timing chart of the three-dimensional image capturing process of the device shown in FIG. 1.

With reference to FIGS. 8A and 8B and FIG. 9, a sensing operation of a three-dimensional image of the three-dimensional capturing device 10 is described below. FIGS. 8A and 8B show a flowchart of a three-dimensional image sensing routine executed in the system control circuit 50, and FIG. 9 shows a timing chart of each of the processes in the three-dimensional image sensing routine.

The three-dimensional image sensing routine is started when the electric power is supplied (reference (a) in FIG. 9). In Step S102, it is determined whether the photographing mode is set on the mode dial 24. When the photographing mode is set, Step S104 is executed in which a real-time image of the subject is indicated. Namely, the subject image is sensed by the CCD 18, and indicated by the LCD monitor 34. Step S106 is then executed in which it is determined whether the release button 22 is fully depressed. When the release button 22 is not fully depressed, the process goes back to Step S102. Namely, until the release button 22 is fully depressed, the sensing operation of the subject by the CCD 18 is repeatedly carried out, so that a moving image of the subject is indicated by the LCD monitor 34. Conversely, when the release button 22 is fully depressed 'reference (b) in FIG. 9), Step S110 and the following Steps are executed.

When it is determined in Step S102 that the photographing mode is not being set, i.e., when it is determined that the reproduction mode is being set, Step S108 is executed in which a still image is indicated. Namely, image data is read from the image recording medium 40, so that the still image is indicated by the LCD monitor 34. When the execution of Step S108 has been completed, the process goes back to Step S102.

In Step S110, a control of the distance measuring light beam is started. Namely, the light source 60 is actuated, and a pulse signal output from the 3D-drive-pulse generating circuit 68 is selected so that the first and second luminous information is sensed. Thus, a control of the CCD 18 is started.

In Step S112, the intensity of light is stepwise or linearly modulated from level 0 to level 31 by the light intensity modulation control circuit 86, and the first luminous information is sensed by the CCD 18. Note that the amount of received light required for sensing the luminous information cannot be obtained only by a single sensing operation, the light emitting operation and the sensing operation are repeatedly carried out. Namely, the distance measuring light beam, for which the intensity is modulated from level 0 to level 31 is emitted at predetermined times (reference (c) in FIG. 9), and the CCD 18 senses the reflected light beam at every time the irradiation of the light source 60 is turned OFF, for example. In each photodiode of the CCD 18, a signal charge is accumulated by repeatedly sensing the reflected light beam, and when a predetermined number of sensing operations has been completed, the sum of the accumulated signal charge is output as the first luminous information, and temporarily stored in the image memory 264.

When a predetermined time has passed since the completion of the sensing operation of the first luminous information, Step S116 is executed in which the intensity of light is stepwise or linearly modulated from level 31 to level 0, and the second luminous information is sensed by the CCD 18 at a predetermined timing (reference (e) in FIG. 9). The light emitting operation and the sensing operation performed in Step S116 are identical with those of Step S112, except that the intensity modulation is reversed. Thus, the sum of the accumulated signal charge, obtained by a predetermined number of irradiations for each photodiode, is sensed in Step S116, and the second luminous information is stored in the image memory 264.

Note that the amount of the first luminous information is one frame's worth, and the amount of the second luminous information is also one frame's worth.

When the first and second luminous information has been sensed, Step S118 is executed in which the control of the distance measuring light beam ends. Namely, the light source 60 is turned OFF, and the 2D/3D switching circuit 70 switches the pulse signal, to be selected, from the 3D-drive-pulse generating circuit 68 to the 2D-drive-pulse generating circuit 66, so that a two-dimensional still image is sensed by the CCD 18.

In Step S120, a two-dimensional color image of one frame's worth is sensed by the CCD 18 with the same angle of view as that of the luminous information sensing operation. Data of the two-dimensional color image is subjected to a predetermined image process, and then stored in the image memory 264 (reference (f) in FIG. 9). When the sensing operation of the two-dimensional color image has been completed, the control of the CCD 18 is stopped.

In Step S122, the first and second luminous information is read from the image memory 264 and output to the system control circuit 50, and the distance information is calculated for every pixel based on the formula (4) (reference (g) in FIG. 9). The distance information of one frame's worth is combined with the two-dimensional color image data according to the texture-mapping method in Step S124, and thus, one frame's worth of three-dimensional image data is obtained (reference (h) in FIG. 9).

The three-dimensional image data is compressed according to a predetermined method such as JPEG in Step S126 (reference (i) in FIG. 9), and is then written in the image recording medium 40 in Step S128 (reference (j) in FIG. 9). Thus, the three-dimensional image sensing operation ends, and the process goes back to Step S102.

As described above, in the three-dimensional image capturing device 10 for obtaining accurate distance information using distance measuring light beams, for which the intensity is modulated, the light amount control is carried out by changing the number of LEDs 161 through 165 to be irradiated. Therefore, the light intensity modulation control circuit 86 is simple and miniaturized, and further the amount of light is controlled stably.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2001-057847 (filed on Mar. 2, 2001) which is expressly incorporated herein, by reference, in its entirety.

What is claimed is:

1. A three-dimensional image capturing device, comprising:
    a light source that has a plurality of irradiating units to irradiate a distance measuring light beam to a subject, the intensities of said distance measuring light beams being different from each other;
    a modulating processor that selects a combination of said irradiating units to be turned on, the modulating processor varying the selected combination of irradiating units to be turned on so that the intensity of said distance measuring light beam is modulated in accordance with the time elapsed from when said light source started irradiating said distance measuring light beam;
    a light sensing processor that senses said distance measuring light beam reflected by said subject in accordance with a timing of the modulation, to obtain luminous information of said subject; and
    a distance obtaining processor that obtains distance information of said subject based on said luminous information.

2. A device according to claim 1, further comprising a lens barrel in which a photographing lens is provided, said irradiating unit comprising a plurality of LEDs that are annularly disposed along an outer periphery of said lens barrel and are connected to each other in series.

3. A device according to claim 2, wherein said modulating processor simultaneously controls the electric current flowing in each of said LEDs.

4. A device according to claim 1, wherein said plurality of irradiating units are concentrically disposed with respect to each other.

5. A device according to claim 4, wherein said plurality of irradiating units comprises first, second, third, fourth, and fiftadiating units, which are arranged radially outwardly in this order, the ratio of the intensities of light beams irradiated by said first, second, third, fourth, and fifth irradiating units being 1:2:4:8:16.

6. A device according to claim 4, wherein each of said irradiating units comprises a plurality of LEDs that are simultaneously turned ON and OFF and irradiate said light beams with a constant intensity.

7. A device according to claim 1, wherein said modulating processor controls said irradiating units independently from each other.

8. A device according to claim 1, wherein said luminous information comprises first and second luminous information, said first luminous information being obtained by stepwise increasing the intensity by said modulating processor, said second luminous information being obtained by stepwise decreasing the intensity by said modulating processor.

9. A device according to claim 8, wherein said distance obtaining processor obtains said distance information using said first and second luminous information.

10. A device according to claim 8, wherein said modulating processor varies the combination of said irradiating units to be turned ON so that the intensity is stepwise changed.

11. A three-dimensional image capturing device, comprising:
    a light source that has a plurality of irradiating units to irradiate a distance measuring light beam to a subject, the intensities of said distance measuring light beams being different from each other;
    a modulating processor that selects a combination of said irradiating units to be turned on, the modulating processor varying the combination of selected irradiating units so that the intensity of said distance measuring light beam is linearly varied in accordance with the elapsed time;
    a light sensing processor that senses said distance measuring light beam reflected by said subject in accordance with a timing of the modulating processor, to obtain luminous information of said subject; and
    a distance obtaining processor that obtains distance information of said subject based on said luminous information.

* * * * *